Patented May 11, 1943

2,318,730

UNITED STATES PATENT OFFICE 2,318,730

PROCESS OF MAKING ALKYLENE POLYAMINES

Alexander L. Wilson, Sharpsburg, Pa., assignor to Carbide and Carbon Chemicals Corporation, a corporation of New York No Drawing. Application May 24, 1941, Serial No. 395,025

10 Claims. (Cl. 260—583)

Alkylene polyamines may be prepared by the condensation of alkylene dichlorides with aqueous ammonia. This method possesses the disadvantage that the reactants are immiscible and the reaction must be carried out in equipment designed for agitation under pressure. In addition, the mixture of aqueous ammonia and the amine hydrochloride formed is corrosive and this presents a hazard in a system under pressure. While the yields in the process are satisfactory, the separation of the free amine from the inorganic salt formed after liberation of the amine from its hydrochloride is difficult and it involves losses of the amine. Moreover, the color and purity of the recovered alkylene polyamines are not of a uniform high standard. Finally, and more significantly, the process is unsatisfactory for making higher alkylene polyamines, such as propylene diamine from propylene dichloride.

According to the present invention, alkylene polyamines are formed by the direct addition of an alkylene imine to ammonia. This process is predicated on the discovery that alkylene imines will react with ammonia with the breaking of the imine ring and the shifting of a labile hydrogen atom of the ammonia molecule to form an alkylene polyamine. In this process, there are no inorganic salts formed and the recovery of the alkylene polyamines is by a simple distillation. The nature of the alkylene polyamine formed depends on the alkylene imine employed and on the conditions of the reaction. Alkylene imines which may be employed may be represented by the formula:

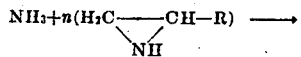

where R is hydrogen or an alkyl radical, and $R_1$ is hydrogen or a monovalent hydrocarbon radical, such as an alkyl, cycloalkyl, aryl, or aralkyl radical.

Where $R_1$ is hydrogen, the general reaction may be represented as follows, showing the addition of one mol of the imine to the ammonia molecule:

Ammonia  alkylene imine  monoalkylene diamine

Under certain conditions, to be discussed later, more than one mol of the alkylene imine may react with a single mol of ammonia and the general reaction then involved may be illustrated in this manner, where $n$ is an integer:

$$H_2N-(CH_2CHRNH)_n-CH_2CHRNH_2$$
polyalkylene polyamine

Where N-substituted alkylene imines are involved, the first step of the reaction consists of the addition of one mol of the N-substituted imine in a manner similar to the first reaction discussed above. This reaction may be represented as follows:

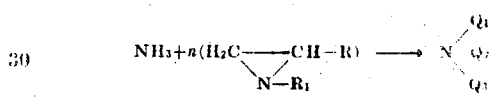

Ammonia  N-substituted  N-substituted monoalkylene
 alkylene imine   diamine

In those circumstances where one or more additional mols of alkylene imine react with a single mol of ammonia, it is probable that the reaction proceeds through the intermediate formation of the N-substituted monoalkylene diamine and the subsequent addition of the N-substituted alkylene imine may be on either the primary or secondary nitrogen atom of this intermediate product. Under these circumstances, the general reaction is as follows:

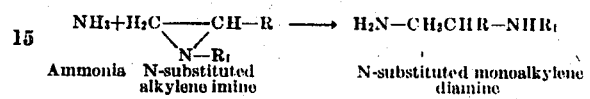

where $Q_1$ is $(CH_2CHRNR_1)_mH$, $Q_2$ is $$(CH_2CHRNR_1)_pH,$$

and $Q_3$ is $(CH_2CHRNR_1)_qH$; $m$, $p$, and $q$ and 0 or integers and are related by the equation $$m+p+q=n$$

$n$ being an integer.

The term "alkylene polyamine" as used herein includes both monoalkylene diamines and polyalkylene polyamines irrespective of whether such compounds are of straight chain or branched chain configuration and whether such compounds have terminal substituted amino groups, or terminal primary amino groups, all as illustrated above.

The character of the alkylene polyamine formed depends on the ratio of the ammonia to the alkylene imine. In general, a high molar ratio of ammonia to imine, for example, a value of 10 to 1, will favor the formation of the monoalkylene diamine, whereas lower molar ratios of ammonia to imine, for instance, 3 or 4 to 1, will promote the production of dialkylene triamines and trialkylene tetra-amines as well as monoalkylene diamines. As a rule, it appears that an excess of ammonia is necessary if it is desired to prevent the formation of relatively large amounts of high boiling polyalkylene polyamines. The reaction is catalyzed by the presence of an excess of water and the reactants may therefore be added in the form of their aqueous solutions.

Reaction temperatures may be between 0° and 200° C., a slow but appreciable reaction occurring at room temperatures. In general, however, somewhat elevated temperatures are preferred to accelerate the reaction and, in such case, the reactants must be enclosed in a pressure resistant vessel to retain the volatile ammonia.

The alkylene polyamines, especially the lower members of the series, are useful to neutralize acids, to inhibit corrosive tendencies, and in the preparation of surface active agents by their condensation with fatty acids. In addition, the higher boiling polyalkylene polyamines, because of their high absorptive capacity for water vapor and acid gases, may be used in processes for purifying and dehydrating gases.

Alkylene imines which may be employed in the process of this invention include unsubstituted alkylene imines, such as ethylene imine, propylene imine and butylene imine, as well as N-substituted alkylene imines. N-substituted alkylene imines which may be used include N-propyl, N-butyl, N-phenyl and N-cyclohexyl ethylene imine. These imines are liquids of moderate boiling points having strong, ammoniacal odors. The alkylene imines may be formed by known reactions, such as by heating aminoethyl sulfate with aqueous sodium hydroxide, in the case of ethylene imine.

The production of azo-tris-ethylimino benzene, $N(C_2H_4-NH-C_6H_5)_3$, by the reaction of N-phenyl ethylene imine with ammonia is typical of one class of the products formed when N-substituted alkylene imines are employed and the following examples will serve to illustrate the practice of the invention as applied to the unsubstituted alkylene imines.

*Example 1.*—Ethylene diamine was prepared by the reaction of 99 grams of a 44% aqueous solution of ethylene imine (containing 1.0 mol of the imine) with 304 grams of 26% aqueous ammonia solution (containing 5 mols of ammonia) in an autoclave at a temperature of 130° C. and under a pressure of 200 to 300 pounds per square inch. After two hours the charge was cooled and fractionally distilled at atmospheric pressure. The yields of alkylene polyamines were ethylene diamine 27%, diethylene triamine 32%, triethylene tetramine 15%, tetraethylene pentamine 11% and residual higher amino products 15%.

*Example 2.*—Propylene imine was prepared by the reaction of amino-isopropyl sulfate with aqueous sodium hydroxide as a liquid boiling at 65° C.

Propylene diamine was prepared by reacting 30 grams (0.5 mol) of propylene imine with 327 grams of 26% aqueous ammonia solution (containing 5 mols of ammonia) in a 500 cc. stainless steel autoclave. The mixture was heated at a temperature of 110° to 120° C. under a pressure of 100 to 200 pounds for two hours after which the mixture was cooled and refluxed until free of excess ammonia. The reaction mixture was then fractionally distilled. The first cut was taken in the range of 99° to 100° C. and consisted mostly of aqueous ammonia. The second cut was taken between 100° and 102° C., weighed 47 grams and contained 0.69 gram of propylene diamine. The third cut was taken between 102° and 122° C., weighed 65 grams and contained 21.3 grams of propylene diamine. The fourth cut taken at 180° to 220° C. consisted of 9 grams of dipropylene triamine. The distillation was then halted, the still residue of higher polyamines weighing only 3 grams. Based on cuts 2 and 3 the yield of propylene diamine was 59% and of dipropylene triamine 27% on the propylene imine basis.

Purified dipropylene triamine was found to have a boiling point of 102° to 103° C. at 10 mm. of mercury pressure, a specific gravity of 0.875 at 20/20° C. and a refractive index of 1.4670 at 20° C.

Other modifications of the process will be apparent and are included in the invention as defined by the appended claims.

I claim:

1. Process for making alkylene polyamines which comprises reacting ammonia with a 1,2-alkylene imine.

2. Process for making alkylene polyamines which comprises reacting ammonia with a 1,2-alkylene imine in the presence of water.

3. Process for making alkylene polyamines including a substantial quantity of a monoalkylene diamine which comprises reacting ammonia with a 1,2-alkylene imine in the molar proportion of at least three mols of ammonia per mol of the alkylene imine.

4. Process for making ethylene polyamines including a substantial quantity of an ethylene diamine which comprises reacting an aqueous solution of ammonia with ethylene imine in the molar proportion of at least three mols of ammonia per mol of the ethylene imine.

5. Process for making alkylene diamines which comprises reacting ammonia with a 1,2-alkylene imine in the molar proportion of at least ten mols of ammonia per mol of the alkylene imine.

6. Process for making alkylene polyamines having at least one terminal hydrocarbon radical which comprises reacting ammonia with a 1,2-alkylene imine substituted at the nitrogen atom with a monovalent hydrocarbon radical.

7. Process for making ethylene diamine which comprises reacting ammonia with ethylene imine.

8. Process for making propylene diamine which comprises reacting ammonia with propylene imine.

9. Process for making alkylene polyamines including substantial quantities of a dialkylene triamine and a trialkylene tetramine which comprises reacting ammonia with a 1,2-alkylene imine in the molar proportion of from one to four mols of ammonia per mol of the alkylene imine.

10. Process for making ethylene polyamines including substantial quantities of diethylene triamine and triethylene tetramine which comprises reacting an aqueous solution of ammonia with ethylene imine in the molar proportion of from one to four mols of ammonia per mol of ethylene imine.

ALEXANDER L. WILSON.

CERTIFICATE OF CORRECTION.

Patent No. 2,318,730.                                        May 11, 1943.

ALEXANDER L. WILSON.

It is hereby certified that error appears in the printed specification of the above numbered patent requiring correction as follows: Page 1, second column, line 35, for "and" before "O" read --are--; and that the said Letters Patent should be read with this correction therein that the same may conform to the record of the case in the Patent Office.

Signed and sealed this 22nd day of June, A. D. 1943.

(Seal)

Henry Van Arsdale,
Acting Commissioner of Patents.